United States Patent
Bhatasana

(10) Patent No.: US 10,240,967 B2
(45) Date of Patent: Mar. 26, 2019

(54) SYSTEMS AND METHODS TO OBTAIN DIAGNOSTIC INFORMATION RELATED TO A BI-DIRECTIONAL PROVER

(71) Applicant: Saudi Arabian Oil Company, Dhahran (SA)

(72) Inventor: Chandulal N. Bhatasana, Abqaiq (SA)

(73) Assignee: Saudi Arabian Oil Company, Dhahran (SA)

( * ) Notice: Subject to any disclaimer, the term of this patent is extended or adjusted under 35 U.S.C. 154(b) by 260 days.

(21) Appl. No.: 15/176,407

(22) Filed: Jun. 8, 2016

(65) Prior Publication Data
US 2017/0356788 A1    Dec. 14, 2017

(51) Int. Cl.
*G01F 25/00* (2006.01)

(52) U.S. Cl.
CPC ...... *G01F 25/0007* (2013.01); *G01F 25/0015* (2013.01); *G01F 25/003* (2013.01)

(58) Field of Classification Search
CPC .......................... G01F 25/0007; G01F 25/0015
USPC ........... 73/1.16, 1.18, 1.19, 1.22, 1.23, 1.34; 702/100
See application file for complete search history.

(56) References Cited

U.S. PATENT DOCUMENTS

| | | | |
|---|---|---|---|
| 3,403,544 A * | 10/1968 | Francisco, Jr. | G01F 25/0015 15/104.063 |
| 4,106,328 A * | 8/1978 | Neeff | G01F 25/0015 280/404 |
| 4,481,805 A * | 11/1984 | Dobesh | G01F 25/0015 73/1.17 |
| 6,629,447 B1 | 10/2003 | Collins | |
| 7,480,577 B1 | 1/2009 | Feller | |
| 7,885,790 B2 | 2/2011 | Straub, Jr. | |
| 8,161,791 B2 | 4/2012 | Ignatian | |
| 8,505,355 B2 | 8/2013 | Rudroff | |
| 8,783,088 B2 | 7/2014 | Weaver | |
| 9,200,932 B2 | 12/2015 | Sittler | |
| 2007/0119227 A1 | 5/2007 | Moriyama | |
| 2011/0130997 A1* | 6/2011 | Day | G01F 25/0015 702/100 |

\* cited by examiner

*Primary Examiner* — Robert R Raevis
(74) *Attorney, Agent, or Firm* — Bracewell LLP; Constance G. Rhebergen

(57) ABSTRACT

The invention provides generally methods and systems in a bi-directional sphere prover for generating diagnostic information by calculating and using multiple meter factors (MF) from four detector switches. A Data Acquisition and Monitoring System gathers the signals of the four detector switches and calculates the base prover volume (BPV) for each section of the prover based on these readings. Then, the different base prover volumes are used to create multiple meter factors for each section of the prover to derive the diagnostic information. The Data Acquisition and Monitoring System displays, archives, and trends the meter factors. Depending upon what particular meter factor ratios are within the acceptable limit, the correct detector switch can be diagnosed and fixed without a substantial amount of down time for the prover. Trend lines for meter factors can also be analyzed for different process fluids that are sent through the prover.

8 Claims, 1 Drawing Sheet

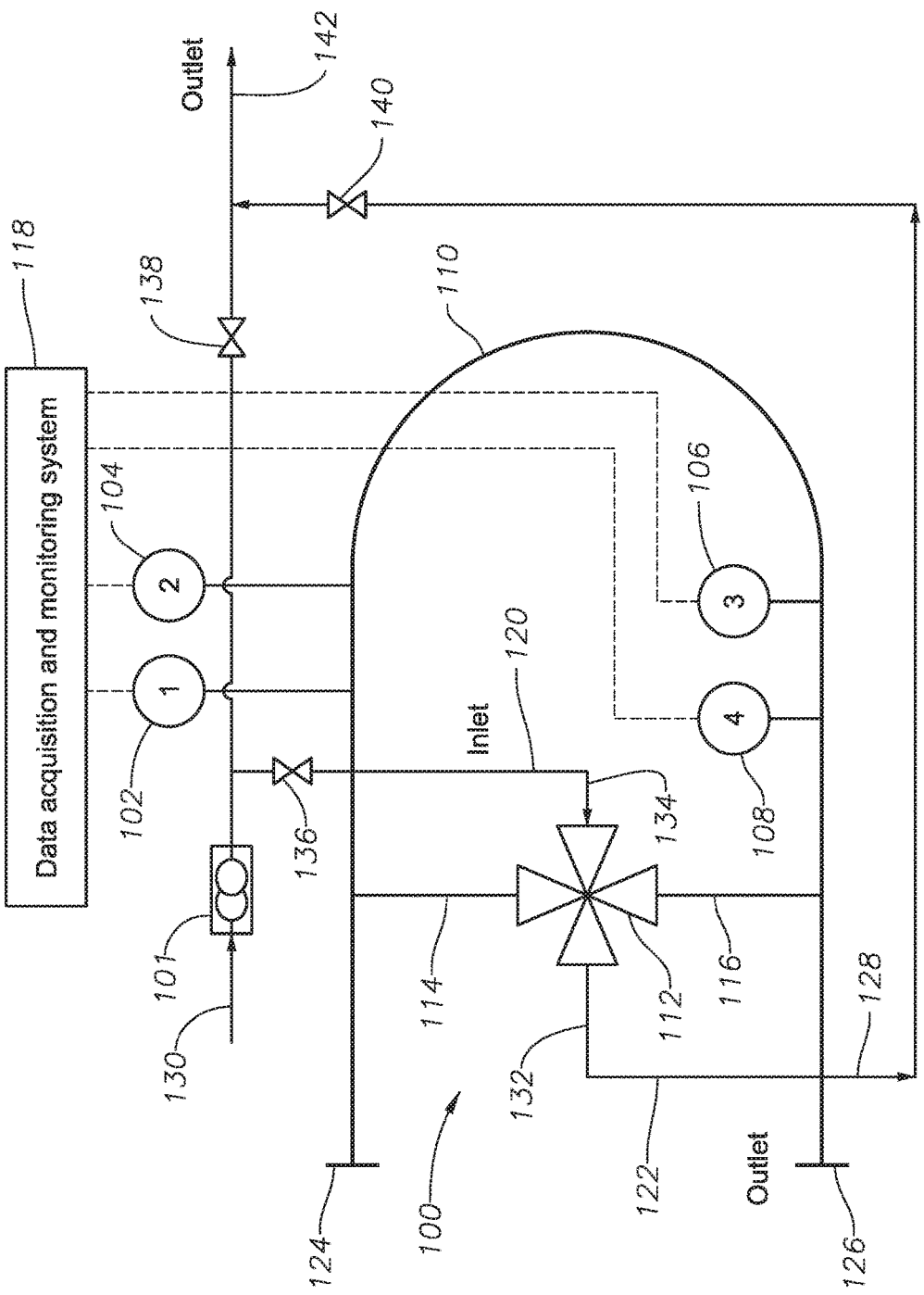

SYSTEMS AND METHODS TO OBTAIN DIAGNOSTIC INFORMATION RELATED TO A BI-DIRECTIONAL PROVER

BACKGROUND

1. Field

Embodiments of the present disclosure relate to systems and methods for obtaining diagnostic information related to the health of sensors in a complete meter proving system including a bi-directional prover in a portion of a pipe for oil-related services.

2. Description of Related Art

Background

It is important in the oil and gas industry to accurately measure the amount of hydrocarbons being transferred in pipeline systems because the material is being bought and sold based upon quantity. When crude oil and natural gas are removed from the ground, they are transported via pipelines from one location to another and the amount of fluid being transferred is measure by a flowmeter. A flowmeter measures the volume of a liquid being sent through a pipeline at various points in the pipeline system where the hydrocarbons "change hands." Flowmeters generally provide pulses to a computer system, which counts and determines the volume based on the number of pulses counted. Examples of flowmeters include turbine meters, vortex meters, ultrasonic meters, positive displacement meters, or any kind of meters that are used in pipeline systems to determine the volume of the liquid.

As noted above, it is important to measure liquid flow volume accurately because ownership of the commodity changes at various points. The accuracy of the flowmeter can be affected by the variation in the characteristics of fluid that is measured. Also, changes in the operating process conditions such as temperature fluctuations and the life cycle of the meter can effect the accuracy of the flowmeter.

Provers are used in pipeline systems transporting various liquid hydrocarbons to accurately calibrate the volume readings of the flowmeter. Provers contain detector sensors that must be constantly checked for accuracy and health to ensure that the prover is accurate and functioning properly. One type of prover is the sphere prover, but other types such as a piston are also known and can be used in the present invention. Sphere provers are used to check the accuracy of the flowmeter and do so by calculating a meter factor for each section of the prover. The prover has a known volume which is calibrated to known set standards of accuracy. The known volume is the amount of fluid that is displaced by the prover sphere as it passes through the pipe section between two detector switches. The base prover volume of liquid that passes through the prover is compared to the meter reading and if the comparison is within a prescribed threshold, then the meter is accurate within the required tolerance levels. If the volume through the prover is significantly different from the meter, then a meter factor can be used to adjust the meter reading to accurately reflect the amount of liquid being pumped through the pipe. The meter factor for a particular section of pipe is found by taking the known base prover volume divided by the flowmeter amount.

Further, provers can be bi-directional or uni-directional. Uni-directional provers contain a displacer, which moves inside the prover pipe section and can be shaped based upon the shape of the pipe. Displacers are propelled by the force of liquid behind the prover, travel in one direction between the detectors and require a displacer handling device where the displacer is moved back to the first sensor in order to recalibrate the meter. Bi-directional provers use a single displacer that is cycled back and forth within a calibrated meter prover pipe or barrel with a pair of detectors at either end. The fluid, from a main pipe, flows in a first direction usually directed by a four way valve pushing the displacer, which is usually a sphere, through the prover. After the displacer gets through the pipe section the four-way valve changes position and the displacer is moved back through the prover to its original position. Sometimes the four-way valve is controlled by a computer, which provides an actuating command for the valve. A pass can refer to the movement of the displacer from one side to the other, while a trial run is a combination of two passes resulting in the displacer moving from the original position to the other side and then back to the original position.

In general, meter proving systems in the U.S. and internationally are governed by the American Petroleum Institute Manual of Petroelum Measurement Standards, Chapter 4-Proving Systems, Section 2, Displacement Provers, Third Edition, September 2003, Reaffirmed March 2011 (API MPMS Chap 4.2). Meter proving using a bi-directional sphere prover is approved by the API standard and the present invention is related to a bi-directional sphere prover.

A typical sphere prover is a section of pipe that is attached to a line delivering hydrocarbon liquid. A sphere travels through the section of pipe actuating a detector at each end of the calibrated section. There is usually a prover computer that activates and totals the flow measured by the flowmeter when the sphere pass through detecting point at each end of the calibration section and stops totalizing when the sphere reaches the other ends of the calibration section. The passing of the sphere through the two detector points is timed, and in effect it is the totalized flowmeter reading for the time required for the sphere to travel between the detecting points. This number is compared with the known volume of the metering pipe between the detecting points to provide an accurate calibration and meter factor.

When meters cannot be proved, there is a potential for error in the flowmeter readings because the flowmeter is not properly adjusted by a meter factor or it is unclear if there needs to be an adjustment of the meter based on the meter factor. The flowmeter in that case reports a reading that is not the accurate total of the fluid that has passed through the pipe. Meter factors are calculated using the difference between the reference base prover volume and the number of pulses counted from the flowmeter while the liquid hydrocarbons are moving through the prover section of pipe. Meters cannot be proved when the prover is inaccurate or down for repair because one of the detectors in the prover is not working properly. Enabling provers to be repaired and monitored quickly will increase the utilization of the prover. Further, these systems need to be continuously monitored because the base prover volume can change due to the buildup of sticky and waxy material inside the prover calibration section.

Normally, provers only have two detector switches according to API 4.2 paragraphs 2.9 and 3.8. The calibrated volume between the two detector switches is defined as Base Prover Volume (BPV) which is used to calculate the meter factor. More switches can be used if more than one calibrated volume is required on the same prover or the detectors can be used to signal that the displacer has entered the sphere resting chamber. Once the sphere has passed through the entire section of the tubes, or sections, then the sphere is reversed and another set of measurements is taken to double check the volume. Usually there are detectors at either end of the prover pipe and four-way valves are operated after the sphere has gone one direction to push it back the other direction.

Flowmeters constantly undergo calibration after each fixed period to check whether or not the metering precision is within a fixed range. Usually a reference volume is used for the calibration. Further, in some systems multiple pairs of detectors to record multiple calibrated prover volumes with a single pass of the displacer/sphere. A computer is usually used to record these volumes, and more than two pairs of sensors can be used. The meter volume is usually determined by pulses that accumulate while the displacer is being moved through the prover and then a flow computer is used to compare the amount of pulses and volume that is arrived at through a pulse-per-unit volume and flow rate to the prover volume.

A pulse is proportional to flow volume and pulse rate is proportional to flow rate. There is a factor that correlates the pulse per unit volume and that can be used to determine the flow rate and volume of the meter. Finally a meter correction factor is generated based upon the discrepancy between the known prover volume and the meter readings based on the pulses. This is applied to the meter and the processor in the flow computer can look to the repeatability of the meter factor to make sure it is within an acceptable range.

Some detector switches can be monitored based upon their output readings when the displacer passes by them. For instance the rising and falling edge of the pulse received from the detector can be analyzed to determine the health of the detector and compared with snapshots of the performance of the detector from the past to determine if the detector switches are performing adequately. In some meters, acoustic signals are sent through the liquid and the transducers used to send these signals may degrade over time. In order to monitor these detectors, the signal to noise ratio, signal amplitude or noise amplitude are used to indicate the overall health of the particular detector being pulsed. Another method that is commonly used in the field, is that a calibration table is built up during a learning period that associates each sensor reading with a flow value. When the sensor reading is off by a threshold amount in the operating period, then the sensor value is replaced from the calibration table. This method is used when meter servicing is very difficult. Detectors can also include inductive or mechanical protrusion detectors.

All of the techniques discussed to derive prover diagnostic information do not take into account historical trends in meter factors and meter factor ratios to determine if the switches are in good health.

SUMMARY

It is important for oil-related operations to have technology to accurately, reliably, and safely measure and fluid flow through pipe systems. These oil-related operations use such measuring in order to properly allocate the fluid. It is also important that such systems allow for the monitoring of the sensors that are used to determine the volume in order that they may be quickly fixed while still reporting the proper volume. Also when detectors are replaced, it is important that the prover be calibrated within an efficient time to allow for quick transfer of the fluid within the system.

Embodiments of systems and methods of the present disclosure are designed, for example, to safely, accurately, and reliably measure and monitor the health of detector switches on a bi-directional sphere prover. It is important to monitor the health of such switches so that they can be replaced and calibrated in an efficient manner. Embodiments of the present invention further can include methods to ensure the health of the apparatus that is used for proving the accuracy of fluid flowmeters. In particular there is provided a prover connected to a flowmeter with any number of detector switches tied to different sections of the prover. There is also provided a displacer in the form of a sphere or any other known displacer common to those in this particular field of invention.

Embodiments of systems and methods of the present disclosure include a flowmeter which has all the process fluid flow through it and into the bidirectional prover. The fluid flows through a 4-way valve and depending on the position of the valve plug, the fluid can flow either in the clock-wise or counter-clock-wise direction around the prover. The displacer is moved in the direction in which the liquid flows. Embodiments of the present invention can further include multiple detector switches that are placed in pairs on opposite sides of the bi-directional sphere prover. Embodiments can include four detector switches, but more can be included as needed. Further, these detector switches can be tied to pulse counters and are for detecting when the sphere passes their particular position as liquid hydrocarbons are let into the prover from a pipeline system valve in order to determine how much liquid is in the prover and accurately adjust the flowmeter. Further, there can me more than one set of pulse counters and more than one set of detector switches that are tied together depending on the design. Embodiments of the invention include four detector switches and four pulse counters, but more can be used depending on the application and the design of the prover.

Embodiments of the present invention can include a Data Acquisition and Monitoring System which includes a computer readable medium with executable computer instructions on it. Further it can include a system which takes the detector signals from the prover monitoring detectors and translates them into the coordinates of the sphere in the prover and also ties them directly to a set of counters for each detector. These counter values can be added and subtracted by the circuitry of the Data Acquisition and Monitoring System allowing for the control system to determine how far the displacer sphere has traveled. The Data Acquisition and Monitoring System can also include display means including a monitor and input means such as a keyboard, mouse or touch screen so the user can input instructions.

Further, when the displacer or sphere reaches the first detector switch, the detector switch provides an electrical signal to the Data Acquisition and Monitoring System. The sphere pushes a plunger portion of the detector switch which tells it that the sphere has passed that point in the prover. The plunger is tied to an electromechanical switch sending a signal to the Data Acquisition and Monitoring System, which knows where exactly that particular detector is along the prover path.

Embodiments of the invention include methods and systems wherein during this step two pulse counters are started that are tied to the detector switch and contained inside the Data Acquisition and Monitoring System indicating the position of the sphere. When the sphere hits the second detector switch the detector provides a signal to the Data Acquisition and Monitoring System indicating a position of the sphere. At that instance, the Data Acquisition and Monitoring System will start two more pulse counters tied to the second detector switch. These pulse counters send signals to the Data Acquisition and Monitoring System that also counts the number of pulses received from the flowmeter.

In this embodiment when the sphere hits the third detector an electrical signal will be provided to the Data Acquisition and Monitoring System. In certain embodiments at that time, the Data Acquisition and Monitoring System will stop a counter tied to the first and second detector switches. As the sphere moves further to the fourth detector along the prover pipe the other two counters tied to the first and second detector switches are stopped. These values are recorded and then compared by the control circuitry of the Data Acquisition and Monitoring System.

Embodiments include a bidirectional sphere prover sending the sphere or displacer in both directions and so the four way valve can first send the displacer clock-wise around the prover and then the four way valve position can be changed again to send the sphere back around the prover in order to get another accurate reading of the count values. The data acquisition and monitoring circuitry can be tied into the four way valve circuitry and the data acquisition and monitoring program can set the four way valve into the forward and reverse positions depending on the instructions from the user.

Embodiments of the invention also include a flowmeter which is tied into the circuity of the Data Acquisition and Monitoring System and provides pulses based on the flow rate and flow volume of the liquid hydrocarbons that are passing through the meter. A meter factor is calculated by the Data Acquisition and Monitoring System for each of the prover sections based on the number of pulse counts provided by the flowmeter and the known base prover volume of the prover sections. The meter factors can be compared by the Data Acquisition and Monitoring System and can further be calculated, displayed, archive and trends can be created. Further, the Data Acquisition and Monitoring System can include a display with images indicating the health of each particular detector switch based upon a comparison of historical data with present detector readings. Based on the ratios of the meter factors, a particular switch can be deemed to be healthy or not and operators can quickly and efficiently repair the prover and detectors to get the pipeline back into working order. Based upon the repeatability, or how close the meter factors are to the ideal based upon the known prover volume, after multiple prover runs, the meter factors can be changed, and if the meter factors are not within a certain threshold, then the detectors can be replaced.

Embodiments of the invention provide a bi-directional prover system that provides diagnostic information relating to detector sensor health. The system includes a bi-directional prover with a pipeline section in a rounded U-shape that contains a displacer; a Data Acquisition and Monitoring System. The system also includes a flowmeter that tracks the amount of liquid and its velocity sent through the bi-directional prover and sends pulses to the Data Acquisition and Monitoring System, a plurality of detector switches that are set on two sides of the bi-directional prover and trigger a set of counters when a displacer triggers the detector switches that are contained in the Data Acquisition and Monitoring System, one or more processors electrically coupled to the Data Acquisition and Monitoring System and having associated non-transitory tangible computer-readable medium and being operable by the one or more processors to execute a set of instructions.

The instructions include starting a counter for each detector switch as the displacer in the prover pipe passes the detector switch, calculating a base prover volume for each section of the prover based on the readings from the plurality of detector switches and pulsed counters, creating meter factors for each section of the prover by taking the pulse counts, and subtracting them based on the location of the detector switches in the pipe section and the base prover volume, comparing meter factors with a meter factor history to determine if there is has been a change in base prover volume before and after a detector switch is changed from each section of the pipe to create a meter factor ratio for each section of the pipe deriving and displaying diagnostic information related to the history, health, trends and archives of the meter factor and the meter factor ratio to determine if the base prover volume has changed over time and if the detector switch needs to be changed based on whether the meter factor ratios are within a certain threshold based on the meter factor ratio.

The instructions also include changing the base prover volume based on the compared meter factor ratios if the base prover volume has changed after the comparison of the newly calculated meter factors and meter factor ratios with the historical data of the prover and repeating the process of deriving meter factor ratios in the pipe section. a four-way valve controlled by the Data Acquisition and Monitoring System; and one or more displays in communication with the one or more processors to display diagnostic information related to the health of the detector switches in oil-related operations within the portion of the pipe.

In accordance with at least one embodiment, the system includes a display that displays information related to the health of the detectors and the information includes meter factor trends, archives, and comparison of current and historical meter factors.

In accordance with at least one embodiment, the system includes at least four detector switches, two each placed on opposite sides of the prover, wherein the first meter factor is derived using the signals detected from the first and third switches, the second meter factor is derived from the first and fourth switches, the third meter factor is derived from the second and third switches, and the fourth meter factor is derives from the second and fourth switches.

In accordance with at least one embodiment, the displacer is a sphere.

Embodiments of the invention provide a method for providing diagnostic information in a bi-directional prover. The method includes the steps of moving a displacer through a prover pipe in the forward and reverse directions, starting a set of counters tied to a set of detector switches, when the displacer in the bi-directional prover passes each detector switch and fluid is sent through the prover moving the displacer and sending the signals from the detector switches to a Data Acquisition and Monitoring System, determining base prover volume for each section of the prover pipe based upon the count values stored in a Data Acquisition and Monitoring System, recording a number of flowmeter pulses and sending it to the Data Acquisition and Monitoring System for the amount of fluid that has passed through prover, and calculating meter factors for each section of the prover and comparing a meter factor before the switch is replaced with one after the switch is replaced to create a meter factor ratio.

The method then determines whether the discrepancy of the meter factors and meter factor ratios when compared with the historical meter factors and meter factor ratios is within a certain threshold and if it is found within the threshold then designating the switches as heathy; and displaying the meter factor ratios, the meter factors and the status of each switch on a display that is connected to a Data Acquisition and Monitoring System and indicating which of the detector switches is in need of repair and which of the switches is healthy based upon the comparison of the meter factors and an analysis of the trends and historical readings of the detector switches.

In accordance with at least one embodiment, the display step includes displaying information related to the health of the detectors and the information includes meter factor trends, archives, and comparison of current and historical meter factors.

In accordance with at least one embodiment, the method includes the step of deriving the first meter factor using the signals detected from the first and third switches, the second meter factor is derived using first and fourth switches, the third meter factor is derived using the second and third switches, and the fourth meter factor is derived using the second and fourth switches.

In accordance with at least one embodiment, the method further includes that the displacer is a sphere.

BRIEF DESCRIPTION OF DRAWINGS

The foregoing aspects, features, and advantages of embodiments of the present disclosure will further be appreciated when considered with reference to the following description of embodiments and accompanying drawings. In describing embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

FIG. 1 is a block diagram of an embodiment of the present invention.

DETAILED DESCRIPTION

Advantages and features of the present invention and methods of accomplishing the same will be apparent by referring to embodiments described below in detail in connection with the accompanying drawings. However, the present invention is not limited to the embodiments disclosed below and may be implemented in various different forms. The embodiments are provided only for completing the disclosure of the present invention and for fully representing the scope of the present invention to those skilled in the art.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of embodiments of the present invention. Like reference numerals refer to like elements throughout the specification.

Hereinafter, various embodiments of the present invention will be described in detail with reference to the accompanying drawings.

Bi-Directional Sphere Prover with Multiple Pairs of Detector Switches

Meter proving systems in the United States are guided by The American Petroleum Institute Manual of Petroleum Measurement Standards, Chapter 4—Proving Systems, Section 2, Displacement Provers, Third Edition, September 2003, Reaffirmed—March 2011 (API Standard). Meter proving using bidirectional sphere provers is approved by this API standard. Various methods and devices have been utilized to determine the health of sensors relating to flowmeter provers. These include using monitoring systems that look at the signal that is returned back from the detector sensors and diagnosing the health of the detector sensor so that the prover will not be down for an extended period of time. However all of these systems for determining the health of sensors within provers do not take into account historical data comparing the meter factor ratios of different sections of the prover pipe. Provers need to be accurate in order to determine the amount of hydrocarbon material that has passed through the pipe in order to properly allocate and price the material.

Provers with monitoring systems disclosed herein take into account trends of meter factors and meter factor ratios to determine the health of the particular sensor within the prover system. Embodiments of the present disclosure display trends of the meter factor ratios and the meter factors over a set amount of time and analyze these trends so that the health of the sensor can be diagnosed. The system includes monitoring systems with computer executable instructions for performing the process of reading the signal returned from the detector switches, computing the meter factor based on the pulses from the flowmeter also attached to the monitoring system and based on the base prover volume already known about the prover.

FIG. 1 is a schematic representation of a prover system 100 for proving a flowmeter 101 in accordance with various embodiments. In one embodiment the flowmeter 101 is a turbine meter, but it is not limited to such an embodiment and can be any type of flowmeter commonly used in pipeline systems. Based upon the turning of a turbine in the flowmeter 101 as the fluid stream passes through the flowmeter 101 from a pipeline entrance 130 the flowmeter generates a pulse where each pulse is proportional to a volume and the rate of pulses is proportional to the volumetric flow rate. The flowmeter 101 is connected to a Data Acquisition and Monitoring System 118, which contains a processor and computer instructions to determine, based upon the pulse count, the flow rate and the volume of liquid which has passed through the flowmeter 101. This value is ostensibly the value that indicates how much liquid has passed through that particular section of pipe within a specified time.

The Data Acquisition and Monitoring System 118 in one embodiment is a computer system containing memory, a hard drive, multiple input and output ports, a display, input means such as a mouse and keyboard, and processor circuitry. The Data Acquisition and Monitoring System 118 may also include network access to share information with other computers throughout the local area network. Other embodiments can include wireless connections as well. The flowmeter 101 and the Data Acquisition and Monitoring System 118 are connected via an electrical connection or a wireless connection and the flowmeter 101 sends the pulses to the Data Acquisition and Monitoring System 118. Other embodiments of the flowmeter may include an ultrasonic meter or any other type of flowmeter known in the art.

Further a displacer, such as a sphere displacer, can be moved through the prover pipe section 110 by allowing the hydrocarbon fluid to flow through the prover system 100 from the pipeline system to prove the flowmeter 101. The displacer is first moved passed the first detector 102, then the second detector 104, then the third detector 106 and finally the fourth detector 108. The volume between the detectors is a known prover volume called the base prover volume BPV. Further, BPV can be calibrated through means of a waterdraw or other method as outlined in the API standards or any other International Standards. In the waterdraw method, water is pumped through the prover flow tube into test measures that are certified by NIST or another weights and measures organization. Water passes the detectors into the measuring tubes so that the displaced volume between the detectors may be accurately established.

The Data Acquisition and Monitoring System 118 controls a four-way valve 112 that allows liquid to flow either through the prover section 110 in a reverse or forward direction. The four-way valve 112 can be any electromechanically controlled valve that is known in the art and can be controlled wirelessly. Further, the valve 112 can be controlled through the control logic of the processor in the Data Acquisition and Monitoring System 118. If the prover is not in use, fluid from the flowmeter 101 does not flow to the prover at all.

When the prover is in use, the Data Acquisition and Monitoring System 118 first keeps the 4-way valve 112 in the 'reverse' position. Fluid, which enters at port 134 leaves 4-way valve 112 at port 116 and passes through the proper pipe portion 110 and re-enters the 4-way valve 112 at port 114. The fluid that re-enters the 4-way valve 112 at port 114 will leave at port 132. The sphere rests at launcher chamber 124. There are three isolation valves 136, 138, and 140. 136 and 140 can be conventional gate or ball type isolation valves while 138 can be a double block and bleed (DBB) type isolation plug valves. The DBB valves can help ensure that a valve is not leaking when it is closed and if it is leaking when it is closed the proving results are invalid. Normally when the flowmeter 101 is not proving and the prover is not in use, the valves 136 and 140 remain in a closed position and valve 138 remains in an open position. All the fluid passing through the flowmeter 101 will bypass the prover 100 in this case. When the flowmeter is going to be proved, the 136 and 140 valves will be opened and valve 138 will be closed. The fluid in this case will enter from the flowmeter 101 and leaves the proving system. The default position of the system is in the 'reverse' direction. The Data Acquisition System 118 controls the valve and keeps it in this 'reverse' position. Fluid in this case enters the 4-way valve 112 and 134 and exits at 116, reenters at 114 and leaves at 132. The 'standby' mode of the prover 100 stabilizes the operating conditions of the prover and flowmeter. When the prover 100 is being used to prove, the 4-way valve is changed to 'forward' and 'reverse' positions as described below. Once the proving operation is over, the Data Acquisition System 118 puts the 4-way valve in the reverse position and valve 138 will be opened and valves 136 and 140 will be closed.

During the start of the proving cycle, when valves 136 and 140 are open and valve 138 is closed, the Data Acquisition and Monitoring System 118 will change the position of the 4-way valve 112 to 'forward' and the fluid that enters the 4-way valve 112 at port 134 will leave it at port 114 and enter the proper pipe portion 110. As the fluid enters the prover pipe portion 110, the displacer actuates or trips the first sensor 102. All the while that fluid is flowing a pulse count is being sent to the Data Acquisition and Monitoring System 118 by the flowmeter 101. When the displacer passes and triggers the first sensor 102, two separate pulse counters C1 and C2 in the Data Acquisition and Monitoring System 118 begin to count. Then, as the displacer sphere moves along the prover pipeline 110, it triggers the second detector switch 104 starting a second set of counters C3 and C4. When the sphere reaches the third detector switch 106, C1 and C3 will be stopped. Further, when the displacer sphere hits detector switch 108, counters C2 and C4 will be stopped.

The values C1-C4 are stored in the memory of the Data Acquisition and Monitoring System 118 and used to later calculate the four meter factors to prove the flowmeter 101. There are four detector sensors or switches on the prover, but there can be more. In this configuration in FIG. 1, there are two on each side and usually they are in pairs. The sensors 102, 104, 106, and 108 can be a transducer or any other detector switch sensor that has a trigger mechanism tied into the tube of the pipeline. It can be actuated by any type of displacer, including a sphere as it passes through the prover pipeline 110.

The same process can be used in reverse. After the displacer passes the last detector switch 108, the values of the pulse counters C1-C4 are recorded by the Data Acquisition and Monitoring System 118. Then, the counters are reset and the process is repeated for the reverse pass of the bi-directional sphere prover system 100. The Data Acquisition and Monitoring System 118 accomplishes this by changing the position of the 4-way valve in to the 'reverse' position. The fluid that enters the 4-way valve 112 at port 134 will leave it at port 116 and enters prover pipe portion 110. The first and second counters C1 and C2 are started in the same way as the forward pass of the bi-directional sphere prover system 100. Liquid flows through the prover pipe section 110 pushing the displacer passed the first detector switch 108 in the reverse direction starting the first two counters C1 and C2. Then it passes the second detector switch 106 in the reverse direction starting the second two counters C3 and C4 in the Data Acquisition and Monitoring System 118.

As the displacer passes the third detector switch 104, the first and third counters are stopped and as it passes the fourth switch 102 the second and fourth counters are stopped. The Data Acquisition and Monitoring System 118 records these values and the process of forward and reverse proving runs continues for as long as the user deems necessary. When the prover is in standby mode, the liquid just passes through the flowmeter 101 and through the four-way valve 112 to its destination along the pipeline 128. This process of a forward and reverse pass can be repeated until the repeatability of the meter factors is within a certain threshold set by the user. Further, depending upon the meter factor ratios and their comparison with historical values and trends, the detector switches can be deemed healthy or in need of repair.

Data Acquisition and Monitoring System 118 takes the obtained count values from the pulse counters and derives four meter factors using four base prover volumes. The first base prover volume (BPV1) is the portion of the prover pipeline 110 from the first switch 102 to the third switch 106. The second base prover volume (BPV2) is from the first switch 102 to the fourth switch 108. The third base prover volume (BPV3) is from the second switch 104 to the third switch 106. The final base prover volume (BPV4) is from the second switch 104 to the fourth switch 108. The distance between the second switch 104 and third switch 106 is sufficient enough to collect ten thousand pulses from the flowmeter 101 if pulse interpolation is not used. Further the distance between the second switch 104 and the third switch 106 complies with criterion of minimum distance between detector switches as defined in the API standards. Also the distance between the first switch 102 and the second switch 104 and the distance between the third switch 106 and the fourth switch 108, are such that the BPV1 is about the same as BPV4, or the base prover volumes between the switches is the same.

All the signals from the four detector switches (102, 104, 106, and 108) and the flowmeter 101 are routed to the Data Acquisition and Monitoring System 118. These connections can be through traditional means or can be wirelessly connected to the Data Acquisition and Monitoring System 118. The Data Acquisition and Monitoring System 118 performs meter factor calculation and can display archive and trend the four different meter factors which are calculated for each section of pipe. It is industry practice that once the detector switch is repaired or replaced, the prover is recalibrated to make sure that none of the base prover volumes have changed. To determine if the base prover volume from one detector switch to another has changed, the meter factor ratios for each section is determined and then compared to the meter factor ratios before the change.

For each prover run, the following method is used to determine the meter factors. The number of flowmeter pulses counted by the flow meters in the forward and reverse direction are used to determine the four meter factors for each section of pipe. The meter factor is the number obtained by dividing the gross standard volume of liquid passed through a meter, as measured by a prover during proving, by the corresponding meter indicated volume at standard conditions. This meter factor is used to show the actual volume measured by the meter.

Because the pulses are being counted from the flowmeter as the sphere is moved through the prover, and the volume of the different sections between the detector switches is known, accurate meter factors can be calculated using the following equation:

MF=KV/(NP*PV), where MF is the meter factor, KV is the known volume of the pipe section, NP is the number of pulses and PV is the volume of liquid per pulse.

Once the meter factors (MF1, MF2, MF3, and MF4) are calculated for each section during a prover run, these numbers are compared with each other. For instance MF1 and MF4 are compared and a ratio is created. These ratios should be close to one and should be constant. The Data Acquisition and Monitoring System 118 constantly calculates and compares these numbers. If after the change of the detector switch, these ratios are not changed, then it can be concluded that the Base Prover Volume in the section has not changed. Further, if there is a change in the value of these ratios, then there will be a change in the value of other ratios among the four meter factors and base prover volume.

For instance, the ratio of MF1 and MF4, which is based off BPV1 from the first switch 102 to the third switch 106 for MF1 and BPV4 and MF4 (calculated from the second switch 104 to the fourth switch 108) should be close to 1. Also the ratio between MF2 (calculated using the distance between the first switch 102 and the fourth switch for MF2) and MF3 (calculated using the distance from the second switch 104 to the third switch 106) should be close to 1 as well.

After the replacement of a faulty switch, the Data Acquisition and Monitoring System determines if the ratios of MF1 to MF4, MF1 to MF2, MF3 to MF4, and MF2 to MF3 for example are not changed. If they are not, it can be concluded that the BPV for each of these pipeline sections has not changed. If there is a change however in the base prover volume from detector switch 102 to detector switch 106, then there must be a corresponding change in value of the ratios of meter factors MF. This is because the value of the prover volume is between two intersecting sections and therefore the ratio should change proportionally. For instance if the first switch 102 is replaced and the value of the ratio between the MF1 and MF4 has increased by two percent, it would indicate that the BPV for the volume from the first switch 102 to the third switch 106 has increased by 2 percent. Also the values of the ratios between MF2 and MF3 and MF1 and MF2 in this case will also be changed, but the ratio between MF3 and MF4 will not be affected because it is not an overlapping section of pipe.

Diagnostic information related to the health of a flowmeter or a prover detector switch is calculated using the above method and system. If the repeatability of the four meter factors is within a limit, it is reported to the user through Data Acquisition and Monitoring System 118 that all the detector switches and flowmeters are acting properly. These meter factors can be compared to past meter factors to show that the system is acting in a healthy manner. If the meter factors is not within a healthy limit, then it can be stated that the flowmeter is faulty and a detector switch is not healthy. If the two meter factors are within an acceptable repeatability limit, predetermined by the user, and the other two are beyond, then a common detector switch is probably faulty for the two meter factors.

For instance, if MF3 and MF4 are within an acceptable repeatability limit based off the past readings of the sensors, and MF1 and MF2 are not repeatable, then the first switch is faulty and this is indicated through the Data Acquisition and Monitoring System. Further if MF1 and MF2 are repeatable but MF3 and MF4 are not repeatable then switch number 2 is faulty and this is indicated to the user. If MF2 and MF4 are repeatable and MF1 and MF3 are not, then it is probably the third detector switch, which is faulty. Finally if the MF1 and MF3 are repeatable and MF2 and MF4 are not, then probably the fourth detector switch is faulty.

Ideally, all four meter factors should be similar, but if there is a constant disparity of any one MF from the other three meter factors, then that would indicate the BPV for that pair of detector switches is not correct.

The running average of the meter factors should be similar and should follow the same trend for the given process fluid within an operating process range. If the running average of the meter factors goes to one direction there may be a buildup of waxy or sticky material. Further, if the running average of two meter factors changes suddenly, the actuation point of the detector switch which is common may have changed affecting the actual volume between the detector switches.

Various modifications can be made to the two prover systems set forth in this Specification and these embodiments described are not intended to limit the scope of the invention. Multiple different types of sensors could be used and multiple different types of flowmeters and computer systems could be used to perform the calculations including mobile devices.

The invention claimed is:

1. A bi-directional prover system that generates diagnostic information relating to detector sensor health, the system comprising:
   a bi-directional prover capable of proving in both the forward and reverse directions connected to a hydrocarbon pipeline with a segmented pipeline section in a rounded U-shape that contains a displacer that is pushed through the pipeline section by fluid let into the pipeline;
   a data acquisition and monitoring computer system;
   a flowmeter that tracks the amount of liquid and its velocity sent through the bi-directional prover and sends pulses to the data acquisition and monitoring computer system;
   a first plurality of detector switches set on a first side of the bi-directional prover configured to trigger a first counter and a second counter in the data acquisition and monitoring computer system when a displacer triggers the first plurality of detector switches;
a second plurality of detector switches set on a second side of the bi-directional prover configured to trigger a third counter and a fourth counter in the data acquisition and monitoring computer system when a displacer triggers the second plurality of detector switches;
the data acquisition and monitoring computer system configured with one or more processors and associated non-transitory tangible computer-readable medium and being operable by the one or more processors to execute a set of instructions comprising:
starting the first counter and the second counter as the displacer in the prover pipe passes the first detector switch of the first plurality of detector switches;
starting the third counter and the fourth counter as the displacer in the prover pipe passes the second detector switch of the first plurality of detector switches;
stopping the first counter and the third counter as the displacer in the prover pipe passes the first detector switch of the second plurality of detector switches;
stopping the second counter and the fourth counter as the displacer in the prover pipe passes the second detector switch of the second plurality of detector switches;
calculating a base prover volume for each section of the prover based on the pulse count readings from the first, second, third, and fourth counters;
creating meter factors for each section of the prover, the meter factors including at least a first meter factor, a second meter factor, a third meter factor, and a fourth meter factor, by taking the pulse count readings for each section of the prover and subtracting them based on the location of the detector switches in the pipe section and the base prover volume;
comparing meter factors with a meter factor history to determine if there has been a change in base prover volume before and after a detector switch is changed from each section of the pipe to create a meter factor ratio for each section of the pipe;
deriving and displaying diagnostic information related to the history, health, trends and archives of the meter factor and the meter factor ratio to determine if the base prover volume has changed over time and if the detector switch needs to be changed based on whether the meter factor ratios for each section of the pipe are within a certain threshold based on the meter factor ratio;
adjusting the base prover volume based on the compared meter factor ratios if the base prover volume has changed after the comparison of the newly calculated meter factors and meter factor ratios with the historical data of the prover; and
repeating the process of deriving meter factor ratios in the pipe section;
a four-way valve controlled by the data acquisition and monitoring computer system; and
one or more displays configured in conjunction with the data acquisition and monitoring computer system to display diagnostic information related to the health of the detector switches in oil-related operations within the pipe.

2. The system of claim 1, wherein the one or more displays display information related to the health of the first plurality of detector switches and the second plurality of detector switches and the information includes meter factor trends, archives, and a comparison of current and historical meter factors.

3. The system of claim 1, comprising two detector switches making up the first plurality of detector switches set on a first side of the bi-directional prover, the first and second switches, and two detector switches making up the second plurality of detector switches set on a second opposite side of the bi-directional prover, the third and fourth switches , wherein the first meter factor is derived using the signals detected from the first and third switches, the second meter factor is derived using the signals detected from the first and fourth switches, the third meter factor is derived using the signals detected from the second and third switches, and the fourth meter factor is derived using the signals detected from the second and fourth switches.

4. The system of claim 1, further including that the displacer is a sphere.

5. A method for generating diagnostic information in a meter proving system, the method comprising the steps of:
moving a displacer through a prover pipe in the forward and reverse directions;
starting a first counter tied to a first set of detector switches, when the displacer in the bi-directional prover passes each detector switch and fluid is sent through the prover moving the displacer and sending the signals from the detector switches to a data acquisition and monitoring system;
starting a second counter tied to a second set of detector switches, when the displacer in the bi-directional prover passes each detector switch and fluid is sent through the prover moving the displacer and sending the signals from the detector switches to a data acquisition and monitoring system;
determining base prover volume for each section of the prover pipe based upon the count values stored from the first and second counters to a data acquisition and monitoring system;
recording a number of flowmeter pulses and sending it to the data acquisition and monitoring system for the amount of fluid that has passed through prover;
calculating meter factors for each section of the prover and comparing a meter factor before the switch is replaced with one after the switch is replaced to create a meter factor ratio;
generating a meter correction factor based upon the discrepancy between the base prover volume and a recorded volume indicated by the recorded number of flowmeter pulses;
determining whether the meter correction factor is within a certain threshold and if it is found within the threshold then designating the switches as heathy; and
displaying the meter factor ratios, the meter factors, the status of each switch on a display that is connected to a data acquisition and monitoring system, and indicating which of the detector switches is in need of repair and which of the detector switches is healthy based upon whether the calculated meter factors and meter factor ratios show a discrepancy when compared with the historical meter factors and meter factor ratios by being outside of the certain threshold.

6. The method of claim 5, wherein the one or more displays display information related to the health of the detectors and the information includes meter factor trends, archives, and a comparison of current and historical meter factors.

7. The method of claim 5, further including the step of deriving the first meter factor using the signals detected from the first and third switches, the second meter factor is derived using first and fourth switches, the third meter factor is derived using the second and third switches, and the fourth meter factor is derived using the second and fourth switches.

8. The method of claim 5, further including that the displacer is a sphere.

* * * * *